United States Patent [19]

Iwamoto et al.

[11] Patent Number: 5,338,437
[45] Date of Patent: Aug. 16, 1994

[54] METHOD FOR HYDROCRACKING A HEAVY HYDROCARBON OIL UTILIZING A FAUJASITE ALUMINOSILICATE

[75] Inventors: Ryuichiro Iwamoto; Ikusei Nakamura; Akira Iino, all of Chiba, Japan

[73] Assignee: Research Association For Residual Oil Processing, Tokyo, Japan

[21] Appl. No.: 871,407

[22] Filed: Apr. 21, 1992

Related U.S. Application Data

[62] Division of Ser. No. 583,873, Sep. 14, 1990, Pat. No. 5,139,984.

Foreign Application Priority Data

Oct. 4, 1989 [JP] Japan .................. 1-257660
Aug. 30, 1990 [JP] Japan .................. 2-226716

[51] Int. Cl.$^5$ .................................................. C10G 47/16
[52] U.S. Cl. .................................. 208/111; 208/110
[58] Field of Search .............................. 208/111, 110

[56] References Cited

U.S. PATENT DOCUMENTS

| | | | |
|---|---|---|---|
| 3,331,882 | 7/1967 | Mattox | 502/79 |
| 3,391,075 | 7/1968 | Plank et al. | 502/79 |
| 4,093,560 | 6/1978 | Kerr et al. | 502/79 |
| 4,259,212 | 3/1981 | Gladrow et al. | 502/79 |
| 4,357,265 | 11/1982 | Chiang | 502/79 |
| 4,663,025 | 5/1987 | Fu | 502/79 |
| 4,820,402 | 4/1989 | Partridge et al. | 208/111 |

FOREIGN PATENT DOCUMENTS

| | | |
|---|---|---|
| 0095305 | 11/1983 | European Pat. Off. . |
| 0256527 | 2/1988 | European Pat. Off. . |
| 58-147495 | 9/1983 | Japan . |
| 62-297389 | 12/1987 | Japan . |
| 2114594 | 8/1983 | United Kingdom . |

*Primary Examiner*—Helane Myers
*Assistant Examiner*—Walter D. Griffin
*Attorney, Agent, or Firm*—Frishauf, Holtz, Goodman & Woodward

[57] ABSTRACT

A hydrocracking catalyst for heavy hydrocarbon oils comprising a metallic element of the VIb Group and a metallic element of the VIII Group supported on a carrier containing a novel faujasite-type aluminosilicate which absorbs an infrared in a frequency region of $3740 \pm 10$ cm$^{-1}$ in an absorption percentage A of at least 20% and absorbs an infrared in a frequency region of $3560 \pm 10$ cm$^{-1}$ in an absorption percentage B of at least 5%, the ratio of A/B being at least 2, has a specific surface area of at least 650 m$^2$/g, has a framework SiO$_2$/Al$_2$O$_3$ molar ratio of from 20 to 50, and has a lattice constant of from 24.15 to 24.50 Å. The novel faujasite-type aluminosilicate is produced by treating a faujasite-type zeolite with an acid.

16 Claims, No Drawings

METHOD FOR HYDROCRACKING A HEAVY HYDROCARBON OIL UTILIZING A FAUJASITE ALUMINOSILICATE

This is a division of application Ser. No. 07/583,873 filed Sep. 14, 1990, now U.S. Pat. No. 5,139,984, issued Aug. 18, 1992.

BACKGROUND OF THE INVENTION (a) Field of the Invention

The present invention relates to a novel faujasite aluminosilicate and a method of producing the same and, more particularly, to a faujasite aluminosilicate which may be suitably used in the field catalysts or the like and a practically advantageous method of producing the same.

Further, the present invention relates to a hydrocracking catalyst for heavy hydrocarbon oils which contains the faujasite aluminosilicate as a catalyst carrier and Is so excellent in catalytic properties as to effect the hydrocracking of heavy hydrocarbon oils with high efficiency and an increased yield of light hydrocarbon oils including gas oil kerosine, and naphtha.

(b) Description of the Related Art

In recent years, time proportion of heavier crude oils is increasing in the worldwide supply of crude oils, and at the same time, the nature of the demand for petroleum fractions is changing, thereby causing a tendency for light hydrocarbon oils to be in short supply and a tendency for heavy hydrocarbon oils to be in excess. Under these circumstances, there have been developed techniques for cracking heavy hydrocarbon oils to convert them to light hydrocarbon oils such as naphtha, kerosine, and gas oil. Among these techniques, hydrogenation treatment techniques such as hydrocracking and hydrogenation refining are very promising because of the capability of producing light hydrocarbon oils of high quality. Therefore, studios for developing effective catalysts for the hydrogenation treatment have recently been actively made, and particularly there have been many studies and propositions for the use of zeolite catalysts.

The use of usual zeolites for the hydrocracking of heavy hydrocarbon oils however causes enormous generation of coke because of their too high acidity, resulting in rapid deactivation. Also, it is undesirable because the cracking proceeds excessively to generate a considerable amount of gaseous hydrocarbons.

In order to solve these problems, there have been proposed some methods in which zeolites are treated with steam at an appropriate temperature to inhibit the generation of coke and the excessive cracking and the resulting steamed zeolites are subjected to acid treatment to control the acid content, thereby improving the activity (Japanese Patent Application Kokai Koho (Laid-open) No. 58-147495, Japanese Patent Application Kokai Koho (Laid-open) No. 62-297389). Nevertheless, further improvement is necessary to put thus improved conventional zeolites to practical use because, when used for the selective hydrocracking of heavy hydrocarbon oils as described above, they do not satisfy all the requirements for catalytic life, the selectivity for light hydrocarbon oils, and catalytic activity and, in addition, the catalytic effectiveness such as catalytic activity and catalytic life are largely influenced by the physical properties of the steamed zeolites to be subjected to the acid treatment and the acid treatment conditions.

SUMMARY OF THE INVENTION

The present invention was made in view of the circumstances described above.

An object of the present invention is to provide a hydrocracking catalyst which is extremely advantageous in practical use in that it effects hydrocracking of heavy hydrocarbon oils efficiently and increases the yield of light hydrocarbon oils such as gas oil kerosine, and naphtha.

Another object of the present invention is to provide a faujasite aluminosilicate having novel properties which can be suitably used in the field of catalysts, for example, as a carrier ingredient or a starting material of the hydrocracking catalyst of the present invention described above, and to provide a method suitable for the production of the faujasite aluminosilicate.

In view of the circumstances described above, the inventors aimed at the development of catalysts which effect the hydrocracking of heavy hydrocarbon oils with high catalytic activity and long catalytic life and as well excel in the yields of light hydrocarbon oils such as gas oil kerosine, and naphtha, and they have conducted repeated research regarding the properties and producing method of the zeolites to be used as carriers or materials suitable for such catalysts.

It is known, as described above, that the catalytic properties of the conventional hydrocracking catalysts of the kinds described above vary considerably depending on the parent zeolites (steamed zeolites) used as carriers and the conditions of the acid treatment. Optimization of the catalytic properties including cracking and hydrogenation efficiency is necessary for performing the hydrocracking of heavy hydrocarbon oils efficiently with a sufficient yield of light hydrocarbon oils such as gas oil, kerosine, and naphtha, and such an optimization requires further development of carriers having properties enabling the optimization.

The inventors directed their attention mainly to the point described above, and they prepared zeolites having various properties by conducting the acid treatment using parent zeolites of various types and properties under various conditions and, then, investigated in detail how the properties of the zeolites relate to the heavy hydrocarbon oil hydrocracking performance.

As the result, they found that metallic ingredients having hydrogenation activity can be supported with good dispersibility on novel zeolites (faujasite zeolites) which are characterized by that the absorption percentages at specified frequency region of infrared absorption spectrum, the framework $SiO_2/Al_2O_3$ molar ratio, and the specific surface area are in specified ranges, respectively, in spite of the high acidity of the novel zeolites. They also found that hydrocracking catalysts satisfying the above objects of the present invention such as catalytic activity are obtainable by supporting specified hydrocracking metallic ingredients on the novel zeolites, and eventually, they completed the present invention.

That is, the present invention provides a novel faujasite aluminosilicate which absorbs infrared in a frequency region of $3740\pm10$ cm$^{-1}$ in an absorption percentage A of at least 20 and absorbs infrared in a frequency region of $3560\pm10$ cm$^{-1}$ in an absorption percentage B of at least 5% the ratio of A/B being at least 2, has a specific surface area of at least 650 m$^2$/g, has a framework $SiO_2/Al_2O_3$ molar ratio of from 20 to 50, and has a lattice constant of from 24.15 to 24.50 Å.

The present invention further provides a suitable method of producing the faujasite aluminosilicate described above, which comprises treating a faujasite zeolite with from 2 to 20 moles of an acid per 1 kg of said faujasite zeolite, said faujasite zeolite having a framework $SiO_2/Al_2O_3$ molar ratio of from 15 to 25, having a specific surface area of at least 500 $m^2/g$, and having a lattice constant of from 24.36 to 24.50 Å.

Further, the present invention relates to the application or the faujasite aluminosilicate and provides a hydrocracking catalyst for a heavy hydrocarbon oil comprising a metallic element belonging to the VIb Group of the Periodic Table and a metallic element belonging to the VIII Group of the Periodic Table which is supported on a carrier containing the faujasite aluminosilicate.

THE PREFERRED EMBODIMENTS OF THE INVENTION

The percentage of infrared absorption was determined by measuring the infrared absorption spectrum of a film (disc) of about 0.1 mm in thickness made of from 20 to 30 mg of a sample using a Self-Support method and then calculating the percentage of infrared absorption by using the high frequency side end of the absorption region at 3740 $cm^{-1}$ as the standard (base line).

The framework $SiO_2/Al_2O_3$ molar ratio was determined by measuring the areas of peaks in high resolution solid Si-NMR spectrum chart in accordance with the general method and calculating the molar ratio using the areas and the following equation:

Skeletal, i.e., framework $SiO_2/Al_2O_3$ molar ratio =

$$2 \times \sum_{n=0}^{4} Isi(nAl) / \sum_{n=0}^{4} (n/4)Isi(nAl)$$

wherein $Isi(nAl)$ represents the area of the peak of Si(-nAl), n representing the number of Al atoms bonding to a Si atom through oxygen atoms (coordination number) and representing an integer of 0 to 4, and the NMR chemical shifts of Si(OAl), Si(1Al), Si(2Al), Si(3Al), and Si(4Al) corresponding respectively to the coordination numbers are $-86\pm3$ ppm, $-80\pm3$ ppm, $-75\pm3$ ppm, $-67\pm3$ ppm, and $-61\pm3$ ppm, respectively, when the internal standard is Si in a silicon rubber. This measuring method enables to determine the $SiO_2/Al_2O_3$ molar ratio only in the zeolite framework, while the ordinary elementary analysis determines a $SiO_2/Al_2O_3$ molar ratio which further includes the content of the aluminum being away from the zeolite framework.

The specific surface area was determined by using a BET method by means of $N_2$ adsorption in accordance with the ordinary method.

The lattice constant was determined from diffraction angle with X-ray diffraction.

Although the method to be used for producing the faujasite aluminosilicate of the present invention is not particularly limited, the method of the present invention is usually suitable.

Hereinafter, the method of the present invention will be described in detail.

The material to be used in the method of the present invention for producing the faujasite aluminosilicate is a faujasite zeolite having a framework $SiO_2/Al_2O_3$ molar ratio of from 15 to 25, preferably from 17 to 23, a specific surface area of at least 500 $m^2/g$, preferably at least 520 $m^2/g$, and a lattice constant of from 24.36 to 24.50 Å, preferably from 24.37 to 24.45 Å.

The preferred faujasite zeolite to be used as the starting material is a steamed faujasite zeolite (a faujasite zeolite which has been treated in hydrothermal condition), particularly, a steamed faujasite zeolite of high crystallinity. As regards zeolites of this type, it is known that the higher the crystallinity is, the larger the specific surface area is and the larger the specific surface area is, the higher the crystallinity is.

Faujasite- zeolites having a lattice constant of more than 24.50 Å are poor In acid-resistance and will suffer from ready destruction of the crystallinity into undesirable form, and, on the other hand, faujasite zeolites having a lattice constant of less than 24.36 Å will cause a decrease In the acidity itself to be used and make it difficult to obtain catalysts having sufficient hydrocracking activity.

The steamed faujasite zeolite described above is obtainable by using, as a material, various kinds of faujasite zeolites having a $SiO_2/Al_2O_3$ molar ratio of at least 4.8, preferably at least 5.0 and a $Na_2O$ content decreased to 3.0% by weight or less, preferably to 2.0% by weight or less, by means of $NH_4^+$ ion exchange, and treating them with steam under the following conditions in accordance with the ordinary hydrothermal treatment.

That is, the conditions appropriate for the hydrothermal treatment generally include a treating temperature of from 500° to 900° C. , preferably from 520 to 850° C. , a treating time of from 0.5 to 5 hours, preferably from 1.0 to 4.5 hours, and a partial pressure of steam of from 1 to 100%, preferably from 5 to 100%. Also, self-steaming using the water possessed in the zeolite used may be employed. The steaming treatment may be conducted by use of various kinds of systems including a flow system and a closed system.

In the method of the present invention, among the above-described faujasite zeolites including the steaming faujasite zeolite obtained by the above steamed treatment, the faujasite zeolite having the above-described specified properties is treated with an acid.

The treatment with an acid is so conducted as to remove efficiently not only the alumina which is not a constituent of the zeolite framework, for example, the alumina layer disconnected from the zeolite framework by the steaming treatment, but also a portion of the aluminum (oxide) remaining as a constituent of the zeolite framework.

Although the aluminum (oxide) in the zeolite framework can be disconnected by the steaming treatment or other means, it is important to perform the disconnection and removal excessively by the treatment with the acid as described above.

That is, in order to provide the specified novel properties to the surface of the zeolite, it is just effective to disconnect and remove even a part of the aluminum (oxide) in the zeolite skeleton by means of the above-described treatment with the acid.

In concrete terms, the treatment with the acid as described above increases sufficiently the content of the silanol group (Si—OH) which causes tile Infrared absorption in a frequency region ($3740\pm10$ $cm^{-1}$).

However, excessive acid treatment may induce undesirable destruction of zeolite crystals, resulting in a decrease in the specific surface area, and will cause a decrease in the amount of the silanol groups (Si—OH) and a decrease beyond the necessity in the amount of the aluminum which takes part in generating the hydrocracking activity.

The acid treatment, therefore, is conducted so moderately as to keep the specific surface area of the zeolite at least to 650 m$^2$/g, preferably at least to 660 m$^2$/g, the absorption percentage A in the region of infrared frequencies (3740±10 cm$^{-1}$) due to the silanol group (Si—OH) of at least to 20%, preferably at least to 22%, the absorption percentage B in the region of infrared frequencies (3560±10 cm$^{-1}$) due to the active point (Brønsted acid) of the aluminum which takes part in generating the hydrocracking activity at least to 5%, preferably at least to 7%, and the ratio between these absorption percentages, A/B, at least to 2, preferably at least to 2.1.

A hydrocracking reaction of hydrocarbons, generally, requires the optimum balance between acidity and hydrogenation activity. In case hydrogen becomes in short supply in the course of the reaction, formation of coke occurs rapidly and even the presence of a large quantity of acid, namely a high crystallinity, becomes incapable of sufficiently effecting hydrocracking. The supply of hydrogen, generally, is performed by increasing the partial pressure of hydrogen, and the supply of hydrogen is effectively facilitated by increasing the number of silanol groups (absorption in the region of 3740±10 cm$^{-1}$) on the aluminosilicate used as a carrier. Such an aluminosilicate having an increased number of silanol groups has both a sufficient acid quantity and a sufficient capacity of hydrogen supply and, therefore, is the most suitable carrier for the hydrocracking reaction. Further, the acid treatment is conducted so moderately that the framework $SiO_2/Al_2O_3$ molar ratio in the zeolite skeleton ranges from 20 to 50, preferably from 22 to 48, and the lattice constant ranges from 24.15 to 24.50 Å, preferably from 24.20 to 24.50 Å.

The conditions for carrying out the treatment with the acid so effectively as described above include the following conditions.

The treating temperature in the treatment with acid 1 s generally from room temperature to 100° C. preferably from 30 to 90 ° C., and the treating time is generally from 0.1 to 12 hours, preferably from 0.5 to 10 hours.

The kind of the acid to be used for the treatment with an acid is not particularly limited, and some examples of the acid which may be used include inorganic acids, for example, mineral acids such as hydrochloric acid, nitric acid, and sulfuric acid, organic acids, for example, acetic acid, and mixtures thereof. Among these, the most preferred is nitric acid.

The amount of the acid to be used in the acid treatment cannot be determined uniformly because it varies depending on the kind of the acid used and other conditions such as treating temperature. Usually, the amount of the acid used is from 2 to 20 moles, preferably from 2.5 to 17.5 moles, per 1 kg of the material zeolite used.

After the acid treatment, filtration and washing by water (for example, washing by hot water) are optionally carried out to remove surplus water and the acid adhering to or being absorbed on the surface, and then, after-treatments, such as drying and calcination, are carried out optionally, according to demand.

Thus, a novel aluminosilicate having the specified properties described above, namely the faujasite aluminisilicate of the present invention can be obtained. Usually, thus obtained faujasite aluminosilicate has a lattice constant not larger than that of the material faujasite zeolite.

Thus obtained faujasite aluminosilicate of the present invention is characteristic in that, generally, the volume of the pores having a diameter of from 8 to 20 Å occupies from 20 to 50% of the total volume of all pores.

Thus obtained faujasite aluminosilicate of the present invention can be used suitably in various fields using zeolites, particularly, as a catalyst carrier, such as the catalyst carrier ingredient of hydrocracking catalysts for heavy hydrocarbon oils or as one of carrier ingredients.

Next, the hydrocracking catalyst of the present invention will be described in detail.

The hydrocracking catalyst of the present invention is obtainable by supporting a metallic element belonging to the VIb Group of the Periodic Table and a metallic element belonging to the VIII Group of the Periodic Table on a carrier containing the faujasite aluminosilicate described above.

Every kind of carrier may be used as the carrier so far as it contains generally from 5 to 95% by weight, preferably from 10 to 90% by weight of the faujasite aluminosilicate described above, and usually, a composition consisting of the faujasite aluminosilicate and an inorganic oxide, such as alumina, silica, titania, or alumina-boria is preferably used.

These inorganic oxides may be used individually or in a combination of two or more of them.

In the course of the preparation of the carrier or the catalyst, if necessary, other ingredients such as a binder ingredient for improving the physical strength of the carrier or the catalyst, or an ingredient for providing a moderate pore distribution may be added to the extent that the effects of the hydrocracking catalyst for heavy hydrocarbon oil of the present invention are not hindered.

It is desirable that the carrier undergoes molding, drying, and calcination according to ordinary methods before it supports the metallic ingredients described above.

The temperature appropriate for the calcination is generally from 400° to 600° C., preferably from 450° to 550° C.

The preferred examples of the metallic element belonging to the VIb Group to be supported on the carrier are tungsten and molybdenum.

The preferred examples of the metallic element belonging to tile VIII Group are nickel and cobalt.

The metal element belonging to the VIb Group and the metal element belonging to the VIII Group need be used jointly.

Metal elements belonging to each Group may be used individually or In a combination of two or more of them.

The desirable amount of the metal element belonging to the VIb Group is generally from 3 to 24% by weight, preferably from 8 to 20% by weight, based on the total weight of the catalyst, and the desirable amount of the metal element belonging to the VIII Group is generally from 0.7 to 20% by weight, preferably from 1.5 to 8% by weight, based on the total weight of the catalyst.

At the time of supporting the metallic ingredient belonging to the VIb Group and the VIII Group respectively on the carrier, supporting of each metallic element may be carried out by using a compound which is used for the preparation of conventional supported catalysts. Element metals or alloys also may be used.

Some examples of the compound of molybdenum or tungsten include molybdate acid, tungstic acid, molybdic acid salts such as ammonium molybdate, tungstic acid salts such as ammonium tungstate, heteropolyacids containing molybdenum and/or tungsten, salts of the heteropoly-acids, and various complex compounds such as molybdenum carbonyl and tungsten carbonyl. Among these, the particularly preferred are ammonium molybdate and ammonium tungstate.

Some examples of the compound of cobalt or nickel include inorganic acid salts such as nitrates, sulfates, phosphates, carbonates, and chlorides, organic acid salts such as acetates, and various inorganic and organic complex compounds such as amine complexes and carbonyl complexes. Among these, the particularly preferred are cobalt nitrate and nickel nitrate.

Other additives such as other metallic ingredients may be added, according to demand, to the extent that the accomplishment of the object of the present invention is not hindered.

The method for supporting is not particularly limited, and various methods may be used, for example, wet supporting techniques using proper solutions, such as an aqueous solution or slurries, including impregnation (including vacuum impregnation), coprecipitation, wet-kneading, adsorption, ion-exchange, and spraying, dry-supporting techniques, including mechanical mixing, vapor-phase adsorption, evaporation, and sublimation, and a combination thereof. Usually, the supporting may be carried out according to an ordinary technique, such as coprecipitation, impregnation or kneading.

After the supporting of the metallic ingredients described above, drying and calcination are carried out optionally in accordance with ordinary methods, followed by, if desired, activation or stabilization such as reduction treatment or pre-sulfurization treatment, to complete the production of the hydrocracking catalyst for heavy hydrocarbon oils or the present invention. These treatments of various kinds may also be performed in the reaction vessel for the hydrocracking previous to the reaction.

The hydrocracking catalyst for heavy hydrocarbon oils of the present invention is an excellent catalyst with a long life, high activity, and high selectivity for light hydrocarbon oils such as gas oil, kerosine, and naphtha and, therefore, may be suitably used in various fields of hydrocracking of heavy hydrocarbon oils, particularly in the field of producing light hydrocarbon oils such as gas oil, kerosine, and naphtha. Also, the catalysts may be used as a catalyst or a catalytic ingredient for other relating hydrogenation treatments.

The following description concerns the reaction conditions of the hydrocracking of heavy hydrocarbon oils under which the hydrocracking catalysts for heavy hydrocarbon oils of the present invention can work most efficiently (reaction conditions for hydrocracking heavy hydrocarbon oils so efficiently as to produce light hydrocarbon oils such as kerosine and naphtha in a high yield).

Some examples of the heavy hydrocarbon oil which is a material suitable for the hydrocracking reaction include atmospheric distillation residual oil, vacuum distillation residual oil, vacuum heavy gas oil, clarified oil, heavy cycle oil, visbreaking oil, tar sand oil, and shale oil.

These may be used individually or as a mixture of two or more of them.

The reaction conditions may be selected from wide ranges including the reaction conditions hitherto undertaken in the conventional hydrocracking of heavy hydrocarbon oils, and usually, the preferable reaction temperature is from 350° to 450° C., the preferable reaction pressure is from 50 to 200 kg/cm$^2$, the preferable ratio between the hydrogen gas supplied and the material oil supplied [H$_2$/oil] is from 500 to 5,000 Nm$^3$/kl, and the preferable LHSV is from 0.1 to 10 hr$^{-1}$.

The reaction system for the hydrocracking is not particularly limited and may be selected from various known systems including a continuous flow system using fixed bed, moving bed, a fluidized bed or a suspensoid bed, a semi-continuous system, and a batch system. Usually, a continuous flow system using, for example, fixed bed may be suitably used.

The hydrocracking reaction can usually be performed sufficiently by a one-stage reaction, but it may also be conducted in a multiple-stage reaction including two or more beds, according to demand.

Also, the hydrocracking reaction may be carried out in the presence of other gas ingredients including inert gases such as gaseous nitrogen, argon, or helium and steam so far as accomplishment of the object of the present invention is not hindered.

In the manner as described above, the hydrocracking of heavy hydrocarbon oils can be performed efficiently with an increased yield of light hydrocarbon oils such as gas oil, kerosine, and naphtha.

Heavier fractions such as the heavy hydrocarbon oil remaining unreacted and the other remaining ingredients such as hydrogen may optionally be recycled to the reaction system, according to demand.

Deactivated catalyst may undergo regeneration treatment to be used for reaction repeatedly.

The present invention will be described in more detail with reference to the following Examples. These Examples, however, are not to be construed to limit the scope of the invention.

EXAMPLES 1 AND 2 AND COMPARATIVE EXAMPLES 1 TO 4

EXAMPLE 1

(1) Preparation of a Steamed Zeolite 1,000 g of a Y-type zeolite having a Na$_2$O content or 0.8% by weight and a SiO$_2$/Al$_2$O$_3$ molar ratio of 5.0 was placed in a rotary kiln and was subjected to self-steamed treatment for 3 hours at 700° C., to obtain a steaming zeolite, referred to as STM zeolite A hereinafter. The properties of the STM zeolite A are shown in Table 1.

(2) Preparation of a Faujasite- Aluminosilicate 500 g of the STM zeolite A obtained above was suspended In 6,250 cc of pure water and heated to 75° C. with stirring, and 4,677 g of a 10 wt % aqueous nitric acid solution was then added into the suspension in 30 minutes. After completion of the addition of nitric acid, the mixture was maintained at 75° C. for 30 minutes and was then filtered. The obtained solids were washed with twenty times amount of hot water followed by drying, to obtain the objective faujasite aluminosilicate, referred to aluminosilicate A hereinafter. The properties of the aluminosilicate A are shown In Table 1.

(3) Preparation of a Hydrocracking Catalyst for Heavy Hydrocarbon Oils 67 g of the aluminosilicate A obtained above and 189 g of boehmite gel were added into 50 cc of an ion-exchange water, and the resulting mixture was kneaded. The kneaded mixture was adjusted to a water content appropriate for wet-extrusion and was then molded at a molding pressure of 30 kg/cm² into granules of 1 mm In diameter and 3 mm in length, The granules were dried at 120 °C. for 3 hours followed by air-calcination at 500° C. for 3, hours, to obtain an aluminosilicate-alumina carrier having an aluminosilicate A content of 65% by weight.

Subsequently, 45 ml of an aqueous solution containing 13 6 g of $Co(NO_3)_2 \cdot 6H_2O$ and 74.8 g of $(NH_4)_6Mo_7O_{24} \cdot 4H_2O$ was added to 75 g of the aluminosilicate-alumina carrier, and the carrier was then vacuum-impregnated with the solution followed by drying at 90° C. for 3 hours and calcination at 500° C. for 5 hours, to obtain a catalyst of pellet form. The catalyst had a cobalt content of 4% by weight in CoO and a molybdenum content of 10% by weight in $MoO_3$.

(4) Hydrocracking Reaction of a Heavy Hydrocarbon Oil

After 100 cc of the catalyst containing the aluminosilicate A, which was obtained above, was charged into a high-pressure fixed-bed flow reactor followed by pre-sulfurization according to ordinary method, a Kuwait atmospheric residue [specific gravity: 0.9770 (15/4° C.), 343+° C. fractions (fractions having boiling points of 343° C. or higher (the same rule applies correspondingly to the following)): 97 % by volume, the content of sulfur as S: 4.2% by weight]was passed through the reactor at a reaction temperature of 400° C., LHSV=0.3 hr$^{-1}$, a partial pressure of hydrogen of 135 kg/cm², and $H_2$/oil ratio of 2,000 Nm³/1, to carry out hydrocracking reaction.

The cracking rate of the 343+° C. fractions, the yield of light hydrocarbon oils, the yield of gas fraction, and the desulfurization rate after 400 hours from the beginning of the reaction are shown in Table 2.

EXAMPLE 2

An aluminosilicate, referred to as aluminosilicate B hereinafter, was prepared using the STM zeolite A in the same manner as in (2) of Example 1 with the exception that the amount of the 10 wt% aqueous nitric acid solution used was changed to 2,254 g. The properties of the aluminosilicate B are shown in Table 1.

A catalyst containing the aluminosilicate B was prepared In the same manner as in (3) of Example 1 with the exception that the aluminosilicate B was used in place of the aluminosilicate A.

Hydrocracking reaction was carried out in the same manner as in (4) of Example 1 with the exception that the catalyst containing the aluminosilicate B was used in place of the catalyst containing the aluminosilicate A.

The cracking rate of the 343+° C. fractions, the yield of light hydrocarbon oils, the yield of gas fraction, and the desulfurization rate after 400 hours from the beginning of the reaction are shown in Table 2.

COMPARATIVE EXAMPLE 1

A steamed zeolite, referred to as STM zeolite B hereinafter, was prepared in the same manner as in (1) of Example 1 with the exception that a Y-type zeolite having a $SiO_2/Al_2O_3$ molar ratio of 4.6 was used. The properties of the STM zeolite B are shown In Table 1.

An aluminosilicate, referred to as aluminosilicate C hereinafter, was prepared in the same manner as in (2) of Example 1 with the exception that the STM zeolite B was used in place of the STM zeolite A. The properties of the STM aluminosilicate C zeolite are shown in Table 1.

A catalyst containing the aluminosilicate C was prepared in the same manner as in (3) of Example 1 with the exception that the aluminosilicate C was used in place of the aluminosilicate A.

Hydrocracking reaction was carried out in the same manner as in (4) of Example 1 with the exception that the catalyst containing the aluminosilicate C was used in place of the catalyst containing the aluminosilicate A.

The cracking rate of the 343+° C. fractions, the yield of light hydrocarbon oils, the yield of gas fraction, and the desulfurization rate after 400 hours from the beginning of the reaction are shown In Table 2.

COMPARATIVE EXAMPLE 2

An aluminosilicate, referred to as aluminosilicate D hereinafter, was prepared using the STM zeolite A In the same manner as in (2) of Example 1 with the exception that the amount of the 10 wt% aqueous nitric acid solution used was changed to 6,930 g. The properties of the aluminosilicate D are shown in Table 1.

A catalyst containing the aluminosilicate D was prepared in the same manner as in (3) of Example 1 with the exception that the aluminosilicate D was used in place of the aluminosilicate A.

A hydrocracking reaction was carried out in the same manner as in (4) of Example 1 with the exception that the catalyst containing the aluminosilicate D was used in place of the catalyst containing the aluminosilicate A.

The cracking rate of the 343+° C. fractions, the yield of light hydrocarbon oils, the yield of gas fraction, and the desulfurization rate after 400 hours from the beginning of the reaction are shown in Table 2.

COMPARATIVE EXAMPLE 3

A steamed zeolite, referred to as STM zeolite C hereinafter, was prepared by charging 1,000 g of a Y-type zeolite having a $Na_2O$ content of 0.8% by weight and a $SiO_2/Al_2O_3$ molar ratio of 5.0 into a rotary kiln followed by self-steaming treatment at 780° C. for 3 hours. The properties of the STM zeolite C are shown in Table 1.

An aluminosilicate, referred to as aluminosilicate E hereinafter, was prepared in the same manner as in (2) in Example 1 with the exception that the STM zeolite C was used in place of the STM zeolite A, The properties or the aluminosilicate E are shown In Table 1.

A catalyst containing the aluminosilicate E was prepared in the same manner as in (3) of Example 1 with the exception that the aluminosilicate E was used in place of the aluminosilicate A.

Hydrocracking reaction was carried out in the same manner as in (4) of Example 1 with the exception that the catalyst containing the aluminosilicate E was used in place of the catalyst containing the aluminosilicate A.

The cracking rate of the 343+° C. fractions, the yield of light hydrocarbon oils, the yield of gas fraction, and the desulfurization rate after 400 hours from the beginning of the reaction are shown in Table 2.

COMPARATIVE EXAMPLE 4

An aluminosilicate, referred to as aluminosilicate F hereinafter, was prepared using the STM zeolite A in the same manner as in (2) of Example 1 with the exception that the amount of the 10 wt% aqueous nitric acid solution used was changed to 490 g. The properties of the aluminosilicate F are shown in Table 1.

A catalyst containing the aluminosilicate F was prepared in the same manner as in (3) of Example 1 with the exception that the aluminosilicate F was used in place of the aluminosilicate A.

Hydrocracking reaction was carried out in the same manner as in (4) of Example 1 with the exception that the catalyst containing the aluminosilicate F was used in place of the catalyst containing the aluminosilicate A.

The cracking rate of the 343+° C fractions, the yield of light hydrocarbon oils, the yield of gas fraction, and the desulfurization rate after 400 hours from the beginning or the reaction are shown In Table 2.

TABLE 1

|  | Example Nos. | | Comparative Example Nos. | | | |
| --- | --- | --- | --- | --- | --- | --- |
|  | 1 | 2 | 1 | 2 | 3 | 4 |
| Properties of parent zeolite (Steamed zeolite) | | | | | | |
| Lattice constant (Å) | 24.39 | 24.39 | 24.40 | 24.39 | 24.35 | 24.39 |
| Bulk $SiO_2/Al_2O_3$ molar ratio | 5.0 | 5.0 | 4.6 | 5.0 | 5.0 | 5.0 |
| Framework $SiO_2/Al_2O_3$ molar ratio | 17.2 | 17.2 | 12.2 | 17.2 | 32.0 | 17.2 |
| Specific surface area ($m^2/g$) | 599 | 599 | 437 | 599 | 482 | 599 |
| Absorption percentage of silanol group (3740 $cm^{-1}$) (%) | 3.8 | 3.8 | 4.2 | 3.8 | 5.6 | 3.8 |
| Volume percentage of 8-20Å pores (%) | 16.3 | 16.3 | 14.2 | 16.3 | 8.4 | 16.3 |
| Crystallinity* (%) | 100 | 100 | 74 | 100 | 73 | 100 |
| Properties of resulting aluminosilicate | | | | | | |
| Lattice constant (Å) | 24.30 | 24.37 | 24.30 | 24.21 | 24.25 | 24.39 |
| Crystallinity* (%) | 55 | 90 | 46 | 14 | 84 | 98 |
| Bulk $SiO_2/Al_2O_3$ molar ratio | 30.9 | 8.7 | 17.3 | 68.8 | 49.5 | 8.2 |
| Framework $SiO_2/Al_2O_3$ molar ratio | 27.7 | 20.2 | 18.7 | 28.6 | 85.6 | 17.4 |
| Specific surface area ($m^2/g$) | 747 | 752 | 547 | 638 | 586 | 687 |
| Absorption percentage A of silanol group (3740 $cm^{-1}$) (%) | 48.4 | 36.6 | 13.3 | 16.3 | 8.1 | 5.7 |
| Absorption percentage of B of Bronsted acid (3560 $cm^{-1}$) (%) | 19.3 | 17.4 | 3.9 | 2.4 | 3.3 | 20.3 |
| Volume percentage of 8-20Å pores (%) | 26.3 | 21.1 | 20.3 | 27.5 | 17.5 | 17.8 |
| A/B | 2.5 | 2.1 | 3.4 | 6.8 | 2.5 | 0.3 |

*The crystallinity was determined by considering that of STM zeolite A to be 100%.

TABLE 2

|  | Example Nos. | | Comparative Example Nos. | | | |
| --- | --- | --- | --- | --- | --- | --- |
|  | 1 | 2 | 1 | 2 | 3 | 4 |
| Percentage of 343+° C. fractions cracked (wt %) | 58 | 62 | 33 | 35 | 23 | 38 |
| Yield of light hydrocarbon oils* (wt %) | 52 | 55 | 32 | 34 | 23 | 35 |
| Yield of gas fractions (wt %) | 6 | 7 | 1 | 1 | 1 | 3 |
| Desulfurizing activity (wt %) | 88 | 87 | 86 | 86 | 85 | 86 |

*The light hydrocarbon oils had boiling points of 343° C. or lower.

What is claimed is:

1. A method for hydrocracking a heavy hydrocarbon oil comprising contacting a heavy hydrocarbon oil with hydrogen and a hydrocracking catalyst comprising (i) a metallic element belonging to Group VIb of the Periodic Table in an amount of 3 to 24% by weight based on the total weight of the hydrocracking catalyst and (ii) a metallic element belonging to Group VIII of the Periodic Table in an amount of 0.7 to 20% by weight based on the total weight of the hydrocracking catalyst, said metallic element being supported on a carrier, wherein said carrier is a composition comprising (a) a faujasite aluminosilicate which absorbs infrared in a frequency region of 3740±10 $cm^{-1}$ in an absorption percentage A of at least 20% and absorbs infrared in a frequency region of 3560±10 $cm^{-1}$ in an absorption percentage B of at least 5%, the ratio of A/B being at least 2, said faujasite aluminosilicate having a specific surface area of at least 650 $m^2/g$, said faujasite aluminosilicate having a framework $SiO_2/Al_2O_3$ molar ratio of from 20 to 50, and said faujasite aluminosilicate having a lattice constant of from 24.15 to 24.50 Å and (b) an inorganic oxide, said faujasite aluminosilicate being present in the composition in an amount of from 5 to 95% by weight based on the total of the amounts of said faujasite aluminosilicate and said inorganic oxide, at a temperature of 350° to 450° C., a pressure of 50 to 200 kg/$cm^2$, a ratio of hydrogen to oil of 500 to 5,000 $Nm^3$/kl and a LHSV of 0.1 to 10 $hour^{-1}$.

2. The method of claim 1, wherein the heavy hydrocarbon oil is selected from the group consisting of atmospheric distillation residual oil, vacuum distillation residual oil, vacuum heavy gas oil, clarified oil, heavy cycle oil, visbreaking oil, tar sand oil and shale oil.

3. The method of claim 2, wherein the metallic element belonging to the VIb Group of the Periodic Table is selected from the group consisting of molybdenum and tungsten.

4. The method of claim 3, wherein the metallic element belonging to the VIII Group of the Periodic Table is selected from the group consisting of cobalt and nickel.

5. The method of claim 4, wherein the inorganic oxide is selected from the group consisting of alumina, silica, titania and alumina-boria.

6. The method of claim 5, wherein the faujasite aluminosilicate absorbs an infrared in the frequency region of 3740±10 $cm^{-1}$ in an absorption percentage A of at least 22% and absorbs an infrared in a frequency region of 3560±10 $cm^{-1}$ in an absorption percentage B of at least 7%, the ratio of A/B being at least 2.1, has a specific surface area of at least 660 $m^2/g$ has a framework $SiO_2/Al_2O_3$ molar ratio of from 22 to 48, and has a lattice constant of from 24.20 to 24.50 Å.

7. The method of claim 6, wherein the faujasite aluminosilicate has a volume of pores having a diameter of 8 to 20 Å which occupies 20 to 50% of the total volume of all pores.

8. The method of claim 7, wherein the inorganic oxide is alumina, said metallic element belonging to the VIb Group of the Periodic Table is molybdenum, and said metallic element belonging to the VIII Group of the Periodic Table is cobalt.

9. The method of claim 8, wherein the method is carried out in a continuous flow system.

10. The method of claim 8, wherein the method is carried out in a batch system.

11. The method of claim 9, wherein the heavy hydrocarbon oil is an atmospheric residue; the temperature is 400° C.; the LHSV is 0.3 hr$^{-1}$; the pressure is 135 kg/cm$^2$ and the ratio of hydrogen to oil is 2,000 Nm$^3$/l.

12. The method of claim 1, wherein the faujasite aluminosilicate is a faujasite aluminosilicate that has been contacted with steam at a temperature of 500° to 700° C. for 0.5 to 5 hours and with an acid at a temperature from room temperature to 100° C. for 0.1 to 12 hours.

13. The method of claim 1, wherein the faujasite aluminosilicate is a faujasite aluminosilicate that has been contacted with steam at a temperature of 520° to 700° C. for 1 to 4.5 hours and with acid at a temperature from room temperature to 100° C. for 0.1 to 12 hours.

14. The method of claim 13, wherein the faujasite aluminosilicate is a faujasite aluminosilicate that has been contacted with an acid selected from the group consisting of hydrochloric acid, nitric acid, sulfuric acid and acetic acid at a temperature of 30° to 90° C. for 0.1 to 12 hours and wherein said acid is in an amount of 2 to 20 moles per 1 kg of the faujasite aluminosilicate.

15. The method of claim 14, wherein the faujasite aluminosilicate is a faujasite aluminosilicate that has been contacted with nitric acid for 0.5 to 10 hours and the amount of the nitric acid is 2.5 to 17.5 moles per 1 kg of the faujasite aluminosilicate.

16. The method of claim 15, wherein the faujasite aluminosilicate is a faujasite aluminosilicate that has been contacted with steam at 700° C.

* * * * *